(12) United States Patent
Bakke et al.

(10) Patent No.: US 6,768,855 B1
(45) Date of Patent: Jul. 27, 2004

(54) VERTICALLY-TAPERED OPTICAL WAVEGUIDE AND OPTICAL SPOT TRANSFORMER FORMED THEREFROM

(75) Inventors: Thor Bakke, Albuquerque, NM (US); Charles T. Sullivan, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 377 days.

(21) Appl. No.: 09/900,004

(22) Filed: Jul. 5, 2001

(51) Int. Cl.[7] ................................................ G02B 6/10
(52) U.S. Cl. ................................. 385/129; 385/131
(58) Field of Search ........................ 385/129, 130–132

(56) References Cited

U.S. PATENT DOCUMENTS

| | | | |
|---|---|---|---|
| 4,999,686 A | * 3/1991 | Autier et al. | ........... 385/14 |
| 5,933,562 A | * 8/1999 | Dutting et al. | ........... 385/131 |
| 6,229,947 B1 | 5/2001 | Vawter et al. | ........... 385/132 |

FOREIGN PATENT DOCUMENTS

JP          2-110405      *  4/1990

OTHER PUBLICATIONS

R. Inaba, M. Kato, M. Sagawa and H. Akahoshi, "Two–Dimensional Mode Size Transformation by Δn–Controlled Polymer Waveguides," *Journal of Lightwave Technology*, vol. 16, pp. 620–624 (Apr. 1998).
T. Bakke and S.D. Mukherjee, "Polymeric Optical Mode Converter for Hybrid Photonic Integrated Circuits," *Proceedings of SPIE Conference on Optoelectronic Interconnects VI*, vol. 3632, pp. 234–241 (Jan. 1999).
R.S. Fan and R. B. Hooker, "Tapered Polymer Single–Mode Waveguides for Mode Transformation," *Journal of Lightwave Technology*, vol. 17, pp. 466–474 (Mar. 1999).
H. Komatsugawa, M. Kamata and K. Sasaki, "Analysis of Mode Size Transformation With a Tapered Directional Coupler," *Applied Optics*, vol. 38, pp. 4509–4515 (Jul. 20, 1999).
L. Eldada and L.W. Shacklette, "Advances in Polymer Integrated Optics," *IEEE Journal of Selected Topics in Quantum Electronics*, vol. 6, pp. 54–68 (Jan./Feb. 2000).
R.Inaba, M. Kato and H. Akahoshi, "Improved Coupling Efficiency Using Δn–Controlled Polymer Waveguides With Two–Dimensional Spot–Size Transformation," *IEEE Photonics Technology Letters*, vol. 12, pp. 404–406 (Apr. 2000).
A. Chen, V. Chuyanov, F.I. Marti–Carrera, S. Garner, W.H. Steier, J. Chen, S. Sun and L.R. Dalton, "Vertically Tapered Polymer Waveguide Mode Size Transformer for Improved Fiber Coupling," *Optical Engineering*, vol. 39, pp 1507–1516 (Jun. 2000).
R.E. Smith, C.T. Sullivan, G.A. Vawter, G.R. Hadley, J.R. Wendt, M.B. Snipes and J.F. Klem, "Reduced Coupling Loss Using a Tapered–Rib Adiabatic–Following Fiber Coupler," *IEEE Photonics Technology Letters*, vol. 8, pp. 1052–1054 (Aug. 1996).

(List continued on next page.)

*Primary Examiner*—Khiem Nguyen
(74) *Attorney, Agent, or Firm*—John P. Hohimer (57) ABSTRACT

An optical waveguide is disclosed in which a section of the waveguide core is vertically tapered during formation by spin coating by controlling the width of an underlying mesa structure. The optical waveguide can be formed from spin-coatable materials such as polymers, sol-gels and spin-on glasses. The vertically-tapered waveguide section can be used to provide a vertical expansion of an optical mode of light within the optical waveguide. A laterally-tapered section can be added adjacent to the vertically-tapered section to provide for a lateral expansion of the optical mode, thereby forming an optical spot-size transformer for efficient coupling of light between the optical waveguide and a single-mode optical fiber. Such a spot-size transformer can also be added to a III–V semiconductor device by post processing.

31 Claims, 3 Drawing Sheets

U.S. PATENT DOCUMENTS

I. Moerman, P.V. Van Daele and P.M. Demeester, "A Review on Fabrication Technologies for the Monolithic Integration of Tapers with III–V Semiconductor Devices," *IEEE Journal of Selected Topics in Quantum Electronics*, vol. 3, pp. 1308–1320 (Dec. 1997).

L. Wu, F. Li, S. Tang, B. Bihari and R.T. Chen, "Compression–Molded Three–Dimensional Tapered Polymeric Waveguides for Low–Loss Optoelectronic Packaging," *IEEE Photoics Technology Letters*, vol. 9, pp. 1601–1603 (Dec. 1997).

* cited by examiner

VERTICALLY-TAPERED OPTICAL WAVEGUIDE AND OPTICAL SPOT TRANSFORMER FORMED THEREFROM

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to optical waveguide devices, and in particular to an optical waveguide having a vertically-tapered waveguide core which can be used to expand an optical mode of light therein in the vertical direction and also to form an optical spot-size transformer that is useful for coupling light between the optical waveguide and a single-mode optical fiber.

BACKGROUND OF THE INVENTION

Optical waveguides formed on a substrate are planar devices in which an optical mode of light therein can be highly elliptical. In order to efficiently couple light between the optical waveguide and a single-mode optical fiber, expansion of the optical mode in the vertical direction (i.e. normal to the plane of the substrate) and/or the horizontal direction (i.e. parallel to the plane of the substrate) is generally required. Different approaches have been proposed for doing this depending upon whether the optical waveguide is formed from epitaxial semiconductor materials or dielectric materials.

A horizontal mode expansion is generally relatively simple to effect since this can be done by photolithographic patterning of one or more layers of the optical waveguide structure (see e.g. U.S. Pat. No. 6,229,947 which is incorporated herein by reference). On the other hand, a vertical mode expansion is relatively difficult since this requires a change in thickness of one or more layers of the optical waveguide over distance.

Various approaches for forming an optical waveguide providing a vertical mode expansion have been reported so far, but these are not straightforward. These approaches, which have been tried with limited success, include the use of special epitaxial growth or etching techniques (see I. Moerman et al, "A Review on Fabrication Technologies for the Monolithic Integration of Tapers with III–V Semiconductor Devices," *IEEE Journal of Selected Topics in Quantum Electronics*, vol. 3, pp. 1308–1320, December 1997; A. Chen et al, "Vertically Tapered Polymer Waveguide Mode Size Transformer for Improved Fiber Coupling," *Optical Engineering*, vol. 39, pp. 1507–1516, June 2000); selective fluorination of a polyimide by electron beam irradiation (see R. Inaba et al, "Two-Dimensional Mode Size Transformation by Δn-Controlled Polymer Waveguides," *IEEE Journal of Lightwave Technology*, vol. 16, pp. 620–624, April 1998); forming the optical waveguide by deposition of polymers in a vertically-tapered trench etched below the surface of a substrate (T. Bakke et al, "Polymeric Optical Mode Converter for Hybrid Photonic Integrated Circuits," *Proceedings of the SPIE Conference on Optoelectronic Interconnects VI*, pp. 234–241, January 1999); and the use of multiple planar waveguiding layers (R. S. Fan et al, "Tapered Polymer Single-Mode Waveguides for Mode Transformation," *IEEE Journal of Lightwave Technology*, vol. 17, pp. 466–474, March 1999).

The present invention represents an advance over the prior art by providing a relatively simple and inexpensive way of forming a vertically-tapered optical waveguide section by varying the thickness of a waveguide core layer in response to the width of an underlying mesa structure that can be photolithographically defined and patterned with a fixed step height. The vertically-tapered optical waveguide section can be incorporated into the optical waveguide together with a laterally-tapered optical waveguide section to form an optical spot-size transformer for efficiently coupling light between the optical waveguide and a single-mode optical fiber.

SUMMARY OF THE INVENTION

The present invention relates to an optical waveguide formed on a substrate and comprising a waveguide core sandwiched between an upper cladding layer and a lower cladding layer, with the lower cladding layer being patterned to form a mesa structure having a width that varies with distance along at least a portion of the length of the optical waveguide, and with the thickness of the waveguide core varying in proportion to the width of the mesa structure. The waveguide core comprises a spin-coatable material which can be a polymer, a sol gel, or a spin-on glass. The upper and lower cladding layers also comprise spin-coatable materials which have indices of refraction that are different (e.g. smaller) from the index of refraction of the waveguide core.

The width of the mesa structure increases nonlinearly with distance over the portion of the mesa structure wherein the width varies. The remainder of the mesa structure can be fixed (i.e. constant) in width. The nonlinear variation in width of the mesa structure can, in some instances, result in a substantially linear variation in thickness of the overlying waveguide core, for example, when the variation in the width of the mesa structure is exponential. The upper cladding layer can be patterned to provide a uniform width over a major part of the length thereof, and in some instances (e.g. to form an optical spot-size transformer using the optical waveguide) can further be patterned to provide a variable (e.g. tapered) width over a minor part of the length thereof. For the part of the upper cladding layer wherein the width is variable, the underlying waveguide core generally has a fixed layer thickness.

The optical waveguide of the present invention is compatible with many different types of substrate materials including semiconductors, glasses, fused silica, sapphire, metals or metal alloys, ceramics, polymers, resins and printed wiring boards. When the substrate comprises silicon, the substrate can further include an insulating layer (e.g. a thermal oxide, a low-pressure chemical-vapor-deposited material, or a plasma-enhanced chemical-vapor-deposited material) formed on an upper side of the substrate below the cladding layer. To aid in forming the optical waveguide, a first silicon oxynitride etch-stop layer can be deposited over the mesa structure; and a second silicon oxynitride etch-stop layer can be deposited over the waveguide core.

For use in the visible and near-infrared wavelength range, the waveguide core generally has a thickness in the range of 0.2–4 microns ($\mu$m). The upper cladding layer can have a width, for example, in the range of 1 $\mu$m to one centimeter. The mesa structure formed in the lower cladding layer can have a width, for example, in the range of 5–250 $\mu$m, with the portion of the mesa structure wherein the width varies with distance being, for example, about 100–1000 $\mu$m long.

The present invention also relates to an optical spot-size transformer for coupling light between an optical fiber and an optical waveguide formed on a substrate, with the optical spot-size transformer including a first section of the optical waveguide located proximate to the optical fiber for altering a lateral dimension of an optical mode of the light, and a second section of the optical waveguide located distal to the optical fiber for altering a vertical dimension of the optical mode of the light. Each section of the optical waveguide comprises a waveguide core sandwiched between an upper cladding layer and a mesa structure formed in a lower cladding layer. In the first section, the waveguide core and the mesa structure are both substantially uniform in width and height, and the upper cladding layer has a substantially uniform height and a nonuniform width that increases with distance away from the optical fiber. In the second section, the height of the waveguide core and the width of the mesa structure both increase with distance away from the optical fiber.

The optical waveguide can be formed as described above, with the waveguide core comprising a spin-coatable material such as a polymer, sol gel, or spin-on glass. The optical waveguide can be formed on a supporting substrate as described previously. To provide coupling of light to or from a single-mode optical fiber, the upper cladding layer can be laterally tapered to provide a minimum width of 0.5–2 microns at an end of the upper cladding layer that faces the optical fiber. The width of the mesa structure in the second section of the optical waveguide preferably increases nonlinearly with the distance away from the optical fiber.

The present invention is further related to a method for forming a vertically-tapered optical waveguide on a substrate, comprising steps for forming a mesa structure on the substrate with a mesa width that varies with distance along at least a part of the length of the optical waveguide, forming a waveguide core on the mesa structure by depositing a spin-coatable material over the mesa structure with a thickness of the spin-coatable material at any point along the length of the optical waveguide being defined by the width of the mesa structure at that point, and forming an upper cladding layer above the waveguide core. The step for depositing the spin-coatable material can be performed by rotating the substrate, spinning on the spin-coatable material over the substrate, and removing the spin-coatable material from the substrate beyond the mesa structure. Additional steps can be provided for forming a first silicon oxynitride etch-stop layer over the mesa structure prior to the step for forming the waveguide core, and forming a second silicon oxynitride etch-stop layer over the waveguide core prior to the step for forming the upper cladding layer.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
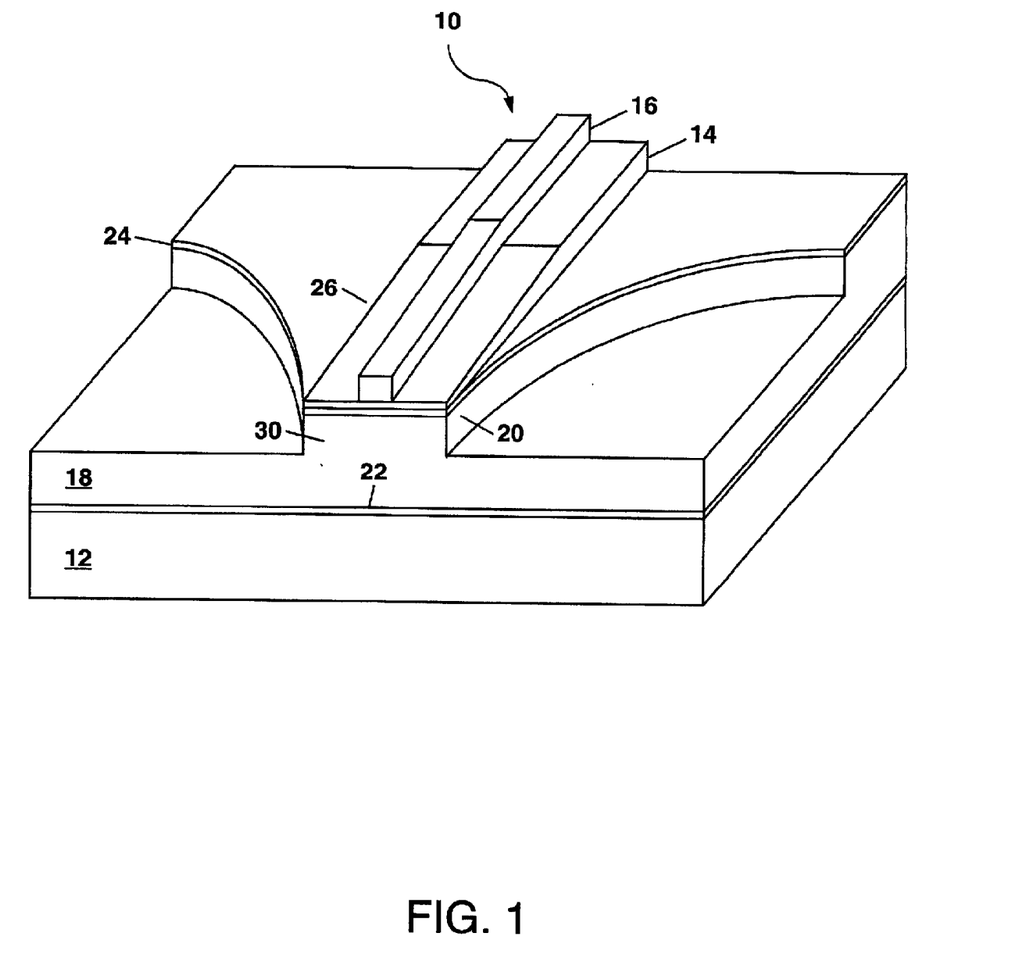
FIG. 1 shows a first example of the present invention in the form of a vertically-tapered optical waveguide.

Referring to FIG. 1, there is shown a first example of the present invention in the form of an optical waveguide 10 formed on a substrate 12. The optical waveguide 10 comprises a waveguide core 14 sandwiched between an upper cladding layer 16 and a lower cladding layer 18. The lower cladding layer 18 is patterned to form a mesa structure 20 that has a width that varies with distance along at least a portion of the length of the optical waveguide 10 (i.e. the variation in width of the mesa structure 20 occurs along a longitudinal axis of the optical waveguide 10).

The term "patterning" as used herein refers to a series of fabrication steps whereby the shape of a plurality of material layers forming the waveguide core 14 and surrounding cladding layers 16 and 18 are defined using a series of standard photolithography, masking, etching, mask stripping and cleaning steps. These steps, which are well known to the semiconductor integrated circuit art and need not be described in great detail herein, are repeated for each material layer to build up the structure of the optical waveguide 10 layer by layer.

In FIG. 1, the substrate 12 can comprise a semiconductor (e.g. silicon or gallium arsenide), glass, fused silica, sapphire, metal or metal alloy, ceramic, polymer, resin (e.g. epoxy), or a printed wiring board (also termed a printed circuit board). If the substrate 12 is electrically conductive (e.g. for a semiconductor, metal or metal alloy, or printed wiring board having a conductive trace thereon) an insulating layer 22 can be provided between the substrate 12 and the lower cladding layer 18 if needed to reduce the absorption of light in the optical waveguide 10 by the substrate 12.

In the case a silicon substrate 12, which can be preferred for certain applications, the insulating layer 22 can be formed by thermally oxidizing a portion of the silicon substrate 12 itself (e.g. by exposing the upper surface of the silicon substrate 12 to an oxidizing ambient such as oxygen or steam at an elevated temperature of, for example, 1100° C. for several hours). Alternately, the insulating layer 22 can be blanket deposited on an upper side of the substrate 12 prior to forming the lower cladding layer 18. Such deposition can be performed, for example, by low-pressure chemical vapor deposition (LPCVD) or plasma-enhanced chemical vapor deposition (PECVD), with the insulating layer 22 comprising silicon dioxide, silicon nitride, silicon oxynitride or a silicate glass (e.g. a silicate glass formed from the decomposition tetraethylorthosilicate). The insulating layer 22 can be, for example, 1–2 $\mu$m thick. An upper surface of the insulating layer 22 can be roughened, if necessary, by etching to promote adhesion of the lower cladding layer 18. Alternately, one or more layers of metal (e.g. chromium and gold) can be blanket deposited over the insulating layer 22 to promote adhesion of the lower cladding layer 18. In some cases, these metal layers can be used as electrodes to a waveguide device (e.g. a modulator) to be formed from a portion of the optical waveguide 10.

To build up the structure of the optical waveguide 10, the lower cladding layer 18 can be formed over the substrate 12 and patterned to form the mesa structure 20. The lower cladding layer 18 can comprise a spin-coatable material such as a polymer which can be spun onto the upper surface of the substrate 12 using conventional spin-coating technology (e.g. using a photoresist spinner) to form a uniform layer having a thickness of a few microns (e.g. 2–10 $\mu$m). Suitable polymers which can be used to form the lower cladding layer 18 include acrylates, polyimides, polycarbonates, polysiloxanes, benzocyclobutene (BCB), perfluorocyclobutane (PFCB), polymethylglutarimide (PMGI), and epoxies, with different polymers exhibiting widely different planarization properties when coated over the mesa structure 20. In some embodiments of the present invention, the lower cladding layer 18 can comprise other spin-coatable materials including a sol gel or a spin-on glass. After deposition, the lower cladding layer 18 can be cured by heat treatment (e.g. exposure to a temperature of up to about 100–200° C. or more for several minutes in a nitrogen ambient) or ultraviolet (UV) light exposure (e.g. for a UV-curable polymer), or both.

The mesa structure 20 in FIG. 1 can be formed from a portion of the thickness of the lower cladding layer 18 by patterning the layer 18 using photolithographic masking (e.g. using a photoresist mask) and etching. The etching can be performed using a reactive ion etching system with an $O_2$/Ar electron-cyclotron resonance plasma, and provides an etch rate of typically 1 $\mu$m/minute for polymers. The lower cladding layer 18 can be, for example, 8–12 $\mu$m thick, formed from one or more spin coatings, with the mesa structure 20 having a height of, for example, 4–6 $\mu$m. The lower cladding layer 18 can comprise, for example, a UV-curable acrylate having an index of refraction of 1.5156.

After patterning of the mesa structure 20, a silicon oxynitride etch-stop layer 24 about 0.1–0.2 $\mu$m thick can be deposited over the mesa structure 20 for protection during subsequent steps for patterning overlying layers. The silicon oxynitride etch-stop layer 24 can be deposited using PECVD or LPCVD with the nitrogen content of the silicon oxynitride preferably being adjusted to control the refractive index of this layer 24 so that it matches the underlying lower cladding layer 18. Adjustment of the nitrogen content can be performed by adjusting a flow rate of a nitrogen-containing source gas (e.g. $NH_3$) which is used to form the silicon oxynitride etch stop layer 24. Although omitted from FIG. 1 for clarity, a second silicon oxynitride etch-stop layer can be provided over the waveguide core 14 for protection during patterning of the overlying upper cladding layer 16. The composition of the second etch-stop layer can be made substantially the same as the waveguide core 14.

According to the present invention, the shape of the mesa structure 20 formed in the lower cladding layer 18 is used to define and vary the thickness of the waveguide core 14 which will be formed superposed over the mesa structure 20 by spinning on another layer of a polymer, sol gel, or spin-on glass having an index of refraction that is different (generally higher) than the index of refraction of the lower cladding layer 18. Defining the thickness of the waveguide core 14 based on the width of the mesa structure 20 is possible according to the present invention since the planarization properties of a spin-coated material (e.g. a polymer) deposited on the mesa structure 20 vary with the width of the mesa structure 20, as a result of balancing of forces due to surface tension and a centrifugal force resulting from rotation of the substrate 12. The surface tension acts to hold the spin-coated material onto the top of the mesa structure 20; whereas the centrifugal force tries to pull the spin-coated material off the top of the mesa structure 20. Different spin-on materials exhibit different planarization properties (i.e. a different variation in layer thickness with width of the mesa structure 20).

By spin coating a particular spin-coatable material (e.g. a polymer) to be used to form the waveguide core 14 on a substrate containing a plurality of etched mesa structures of differing widths (e.g. in a range of 5–250 $\mu$m width) arranged parallel to each other and then measuring the resulting thickness of that spin-coated material on top of each mesa structure after curing, the dependence of layer thickness on mesa width can be ascertained for that particular spin-coatable material. Then, using this measured dependence of layer thickness on mesa width, an optimum shape for the mesa structure 20 can be determined for that spin-coatable material to provide a desired vertical tapering of the waveguide core 14. This ability to tailor the thickness of the waveguide core 14 by varying the width of the underlying mesa structure 20 according to the present invention is advantageous since the width of the mesa structure 20 can modified relatively easily by patterning; whereas it is much more difficult to pattern the thickness of the waveguide core 14 by etching or other methods used heretofore.

Generally, the optimum shape for the mesa structure 20 in a vertically-tapered section 26 of the optical waveguide 10 where the waveguide core 14 is to be vertically tapered in height will require a nonlinear change in the width of the mesa structure 20 over distance along this section 26 of the length of the optical waveguide 10 (i.e. along a direction of propagation of the light in the waveguide 10 over at least the section 26). As an example, for a polymer waveguide core 14 comprising a polycarbonate material, the required shape of the mesa waveguide 20 has been determined to be exponential in order to provide a linear variation in thickness of the waveguide core 14 over the vertically-tapered section 26 of the optical waveguide 10. This is schematically illustrated in FIG. 1. Here, the width of the mesa structure can vary exponentially along a certain length (e.g. 100–1000 $\mu$m or more) of the optical waveguide 10 from a width of, for example, 5–10 $\mu$m to a width of 250 $\mu$m. In other sections of the optical waveguide 10, the width of the mesa structure 20 can be fixed (i.e. unchanging with distance along the optical waveguide 10) as shown in the example of FIG. 1 so that the thickness of the waveguide core 14 will be constant in these sections of the optical waveguide 10.

In FIG. 1, the waveguide core 14 can be formed by spin coating the polymer, sol gel or spin-on glass over the mesa structure 20 to define the vertical taper of the waveguide core 14 in the section 26. Generally, the thickness of the waveguide core 14 will be in the range of 0.2–4 $\mu$m depending upon a particular wavelength of the light with which the optical waveguide 10 is to be used. As an example, for use with light at a wavelength of 1.3 $\mu$m, the thickness of the waveguide core 14 can be vertically tapered from 2 $\mu$m to 0.6 $\mu$m over a distance of 500–1000 $\mu$m to provide an adiabatic transformation of the optical mode of the light without optical loss. Nowhere is the waveguide core 14 tapered down to zero thickness. This is not possible since a relatively thick layer (e.g. 2–4 $\mu$m) of material must be spun on the substrate 12 over the mesa structure 20 with a minimum width of the mesa structure 20 defining a minimum thickness of the waveguide core 14.

The composition of the material forming the waveguide core 14 can be selected to have an index of refraction that is larger than the indices of refraction of the cladding layers 16 and 18 to form a guiding optical waveguide 10 which is generally to be preferred. For example, when a UV-curable acrylate is used for the cladding layers 16 and 18, the waveguide core 14 can comprise a polycarbonate polymer having an index of refraction of 1.5396.

Figure 2:
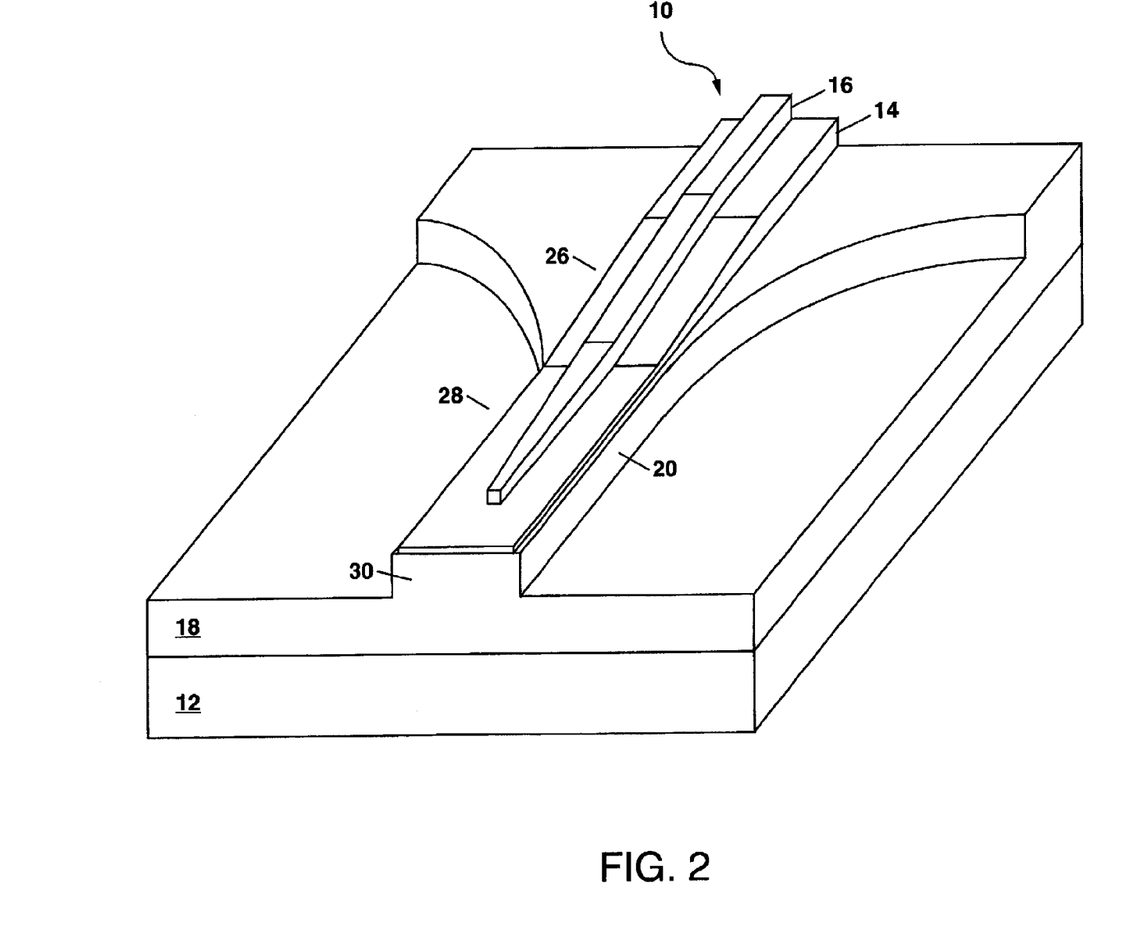
FIG. 2 shows a second example of the present invention in the form of an optical spot-size transformer.

Once the waveguide core 14 has been formed by spin coating over the substrate 12 and cured, a patterning step can be provided to shape the width of the waveguide core 14 along the length of the optical waveguide 10 and to remove the remainder of the spin-coated material that was used to form the waveguide core 14 from the substrate 12. The shape of the width of the waveguide core 14 can be arbitrary and need not conform to the shape of the mesa structure 20. In general, the shape of the waveguide core 14 will depend upon a particular application of the optical waveguide 10 and on whether an optical waveguide device (e.g. a modulator) is to be formed from a part of the optical waveguide 10 beyond the vertically-tapered section 26. For example, the waveguide core 14 can have a uniform width as shown in FIGS. 1 and 2. As another example, the waveguide core 14 can be tapered inward or flared outward with distance over a portion or the entirety of the length of the optical waveguide 10. During patterning of the waveguide core 14 by etching (e.g. reactive ion etching), the underlying silicon oxynitride etch-stop layer 24 can be used to protect the mesa structure 20 from being etched.

Lateral guiding of light in the waveguide core 14 can be achieved by an overlying rib structure formed in the upper cladding layer 16 as shown in FIG. 1, or alternately by altering the refractive index across the width of the waveguide core 14. This can be done, for example, in the case of certain polymers by photobleaching portions of the waveguide core 14 using UV light.

Once the waveguide core 14 has been formed, the upper cladding layer 16 can be formed on the substrate 12 over the waveguide core 14. This can be done using another spin-coating step, with the upper cladding layer 16 comprising a spin-coatable material which can have the same composition as the lower cladding layer 18, or a different composition providing an index of refraction different from that of the waveguide core 14.

The upper cladding layer 16 can then be patterned (e.g. by masking and reactive ion etching) to provide an arbitrary shape which can be uniform in width, or alternately tapered or flared. The width of the patterned upper cladding layer 16 can range from a minimum of about 1 $\mu$m up to a maximum of about one centimeter, with the thickness of the upper cladding layer 16 being, for example, 2 $\mu$m. The upper cladding layer 16 can also be completely removed from some portions of the optical waveguide 10 (see FIG. 2).

For many applications, the upper cladding layer 16 can be patterned to form a rib structure having a uniform width (e.g. 4–30 $\mu$m) over a major part of the length thereof as shown in FIGS. 1 and 2. A second silicon oxynitride etch-stop layer (not shown) can be used to protect the underlying waveguide core 14 from being etched during formation of the rib structure. This completes formation of the optical waveguide 10, which in the example of FIG. 1, is shown as a strip-loaded waveguide with a vertically-tapered section 26. Such a device 10 can act as an optical spot-size transformer to change the vertical dimension of an optical mode of light being coupled into or out of the optical waveguide 10.

In many instances, it is also desirable to effect a change in the lateral (i.e. horizontal) dimension of the optical mode of the light being coupled into or out of the optical waveguide 10. This can be done by providing a laterally-tapered section 28 in the optical waveguide 10 wherein the upper cladding layer 16 is reduced in width by patterning over a portion of the length of the optical waveguide 10 as shown in FIG. 2. Here, the width of the upper cladding layer 16 can be tapered down to 0.5–2 $\mu$m and then abruptly terminated at or before an end 30 of the optical waveguide 10. Such tapering, which does not go to zero, is relatively simple to perform using conventional photolithography and etching and functions to force the optical mode to expand downward into the mesa structure 20 when the rib structure formed in the upper cladding layer 16 becomes sufficiently narrow (e.g.$\leq$1 $\mu$m) together with the reduced thickness of the waveguide core 14 at this point. The mesa structure 20 then acts as a mesa waveguide to channel the expanded optical mode of the light to the end 30 of the optical waveguide 10 (see FIG. 3).

The lateral tapering of the upper cladding layer 16 and its abrupt termination forces the optical mode of the light, which is normally localized about the waveguide core 14, to be diverted downward into the mesa structure 20 where the optical mode spreads out laterally (i.e. horizontally). The net result is that the optical mode of the light within the optical waveguide 10 is altered in both the horizontal and vertical directions as it traverses the optical waveguide 10. This allows the optical waveguide 10 to be used as an optical spot-size transformer to provide efficient coupling of light to or from an optical fiber which is located in proximity to a cleaved end 30 of the optical waveguide 10 nearest the laterally tapered upper cladding layer 16. At this end 30 which is used for coupling to a single-mode optical fiber, the mesa structure 20 can have a lateral dimension that is about the same as a mode-field diameter of a single-mode optical fiber to which the light is to be coupled into or out from. For example, the mesa structure 20 can be 10 $\mu$m wide for coupling into a single-mode optical fiber having a mode-field diameter of 9 $\mu$m (and a core diameter of about 8 $\mu$m), with the height of the mesa structure 20 being about one-half of the 8–12 $\mu$m thickness of the lower cladding layer 18 as originally formed prior to etching the mesa structure 20.

Figure 3:
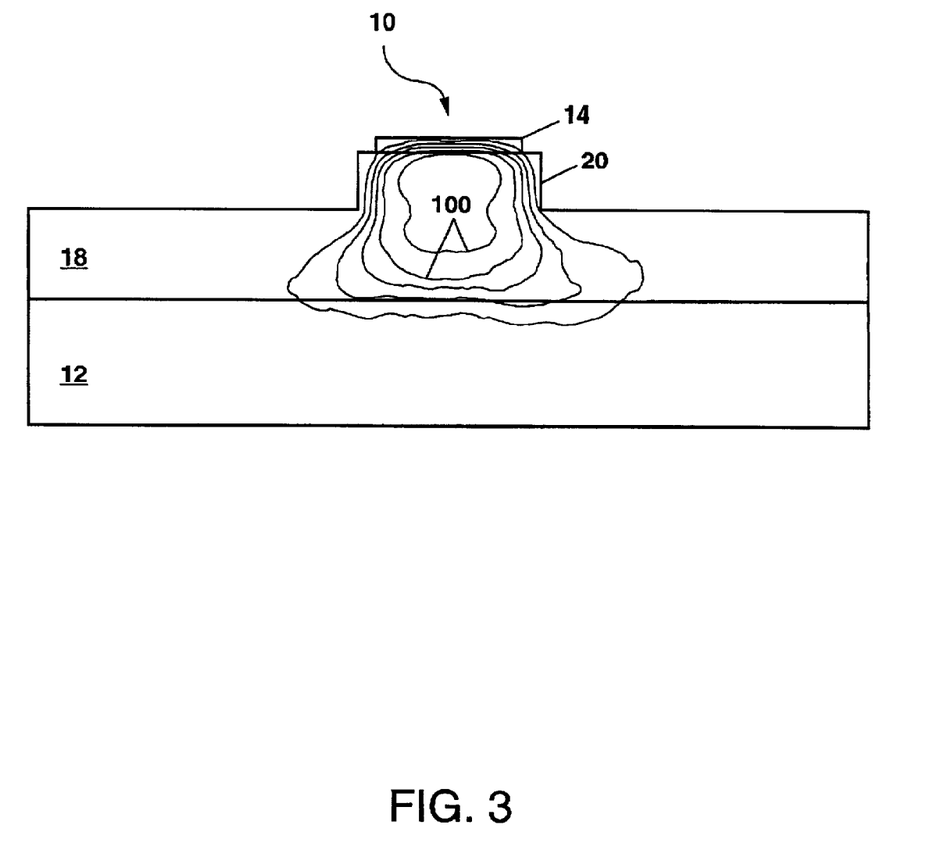
FIG. 3 shows an end of the optical spot-size transformer which can be positioned proximate to an optical fiber for coupling of light therebetween, and a superposed experimental contour plot of an expanded optical mode of the light as produced by the optical spot-size transformer.

FIG. 3 shows an end view of the optical waveguide 10 at the fiber-coupling end 30 together with a measured optical mode profile 100 of light exiting the optical waveguide 10 at this point. The measured optical mode profile, for this device 10 having a 10-$\mu$m width for the mesa structure, a 0.6 $\mu$m thickness for the waveguide core 14 and a minimum width of 1 $\mu$m for a tapered rib structure formed from the upper cladding layer 16, is shown as a series of contour lines representing different intensity values of light in the optical mode, and with the innermost contour line represent the highest intensity of the light in the optical mode. This mode profile 100 is well-matched to the circular mode of a single-mode optical fiber having a 9-$\mu$m mode-field diameter, thereby providing a calculated mode transformation loss of only 0.6 dB between the optical waveguide 10 and the fiber corresponding to a mode overlap integral of 87%. The experimentally measured mode transformation loss for this device 10 was determined to be 0.9–1.3 dB, with the increase in loss being partially due to sidewall roughness and imperfections in waveguide end facets which cause scattering. As shown above, the optical waveguide 10 of the present invention provides a substantial improvement over an optical waveguide without the vertically-tapered and laterally-tapered sections 26 and 28 for which the loss in coupling to the single-mode optical fiber is calculated to be 3.9 dB due to mode mismatch, and measured to be 4–5 dB.

In contrast to the expanded optical mode 100 shown in FIG. 3, the optical mode at the other end of the optical waveguide 10, where the waveguide core 14 is thickest in FIGS. 1 and 2, is elliptical and centered about the waveguide core 14.

In addition to improving the coupling efficiency of light between the optical waveguide 10 and a single-mode optical fiber, the provision of the vertically- and laterally-tapered waveguide sections, 26 and 28, can relax an alignment tolerance of the optical fiber to the optical waveguide 10. In the present example, the single-mode optical fiber can theoretically be moved ±4 µm relative to the fiber-coupling end 30 of the device 10 in FIG. 2 before the coupling loss exceeds that of a comparable optical waveguide without the optical spot-size transformer formed by the sections 26 and 28. This relaxed alignment tolerance can reduce the cost for packing the optical waveguide 10, or any device formed therefrom.

For coupling of light into and out of the optical waveguide 10 of the present invention, the vertically-tapered section 26 and the horizontally-tapered section 28 can be provided at one or both ends of the optical waveguide 10, depending upon a particular application for the optical waveguide 10. For example, to form a modulator, electrodes can be formed above and below a section of the optical waveguide 10 where the waveguide core is thickest, and the sections 26 and 28 can be formed at either end of the optical waveguide 10.

As another example, the optical waveguide 10 of the present invention can be integrated with a III–V semiconductor device (e.g. an edge-emitting laser or a modulator) by post processing using the various steps described previously. In this instance, the III–V semiconductor device can be initially fabricated, and the optical waveguide 10 formed as described previously by spin coating technology and patterning, with the optical waveguide 10 being butt-coupled to one or both ends of the III–V semiconductor device. The optical waveguide 10 can then form an optical spot-size transformer for more efficient coupling of light between the III–V semiconductor device and a single-mode optical fiber.

The present invention provides an ability to adapt to a wide range of optical waveguide shapes, sizes and geometries, and has the potential to eliminate the current need for individually-tailored optical spot-size transformers for each device which must be currently realized by various methods including epitaxial regrowth and selective etching. With the present invention, an optical waveguide 10 can be easily adapted to semiconductor or non-semiconductor devices during or after fabrication.

Other applications and variations of the present invention will become evident to those skilled in the art. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An optical waveguide formed on a substrate and comprising a waveguide core sandwiched between an upper cladding layer and a lower cladding layer, with the lower cladding layer being patterned to form a mesa structure having a width that varies with distance along at least a portion of the length of the optical waveguide, and with the thickness of the waveguide core varying in proportion to the width of the mesa structure.

2. The optical waveguide of claim 1 wherein the waveguide core comprises a spin-coatable material selected from the group consisting of polymers, sol gels, and spin-on glasses.

3. The optical waveguide of claim 1 wherein the thickness of the waveguide core varies substantially linearly with distance above the portion of the mesa structure wherein the width varies with distance.

4. The optical waveguide of claim 2 wherein the upper and lower cladding layers each comprise spin-coatable materials which have indices of refraction that are different from an index of refraction of the waveguide core.

5. The optical waveguide of claim 4 wherein the indices of refraction of the upper and lower cladding layers are smaller than the index of refraction of the waveguide core.

6. The optical waveguide of claim 1 further including a first silicon oxynitride etch-stop layer deposited over the mesa structure.

7. The optical waveguide of claim 6 further including a second silicon oxynitride etch-stop layer deposited over the waveguide core.

8. The optical waveguide of claim 1 wherein the width of the mesa structure varies nonlinearly with distance over the portion of the mesa structure wherein the width varies.

9. The optical waveguide of claim 1 wherein the width of the mesa structure varies exponentially with distance over the portion of the mesa structure wherein the width varies.

10. The optical waveguide of claim 1 wherein the upper cladding layer is patterned to provide a uniform width over a major part of the length thereof and a variable width over a minor part of the length thereof.

11. The optical waveguide of claim 10 wherein the width of the upper cladding is uniformly tapered along the minor part of the length thereof, and the thickness of the waveguide core is fixed underneath the minor part of the length of the upper cladding wherein the width of the upper cladding is uniformly tapered.

12. The optical waveguide of claim 1 wherein the substrate comprises silicon.

13. The optical waveguide of claim 12 wherein the substrate further includes an insulating layer formed on an upper side of the substrate below the lower cladding layer.

14. The optical waveguide of claim 13 wherein the insulating layer comprises a material selected from the group consisting of a thermal oxide, a low-pressure chemical-vapor-deposited material, or a plasma-enhanced chemical-vapor-deposited material.

15. The optical waveguide of claim 1 wherein the waveguide core has a thickness in the range of 0.2–4 microns.

16. The optical waveguide of claim 15 wherein the upper cladding layer has a width in the range of 1 micron to one centimeter.

17. The optical waveguide of claim 16 wherein the mesa structure formed in the lower cladding layer has a width in the range of 5–250 microns.

18. The optical waveguide of claim 17 wherein the portion of the mesa structure wherein the width varies with distance has a length in the range of 100–1000 microns.

19. An optical spot-size transformer comprising the optical waveguide of claim 1.

20. An optical spot-size transformer for coupling light between an optical fiber and an optical waveguide formed on a substrate, comprising:

(a) a first section of the optical waveguide located proximate to the optical fiber for altering a lateral dimension of an optical mode of the light, with the first section further comprising a waveguide core sandwiched between an upper cladding layer and a mesa structure formed in a lower cladding layer, with the waveguide core and the mesa structure both being substantially uniform in width and height, and with the upper cladding layer having a substantially uniform height and a nonuniform width that increases with distance away from the optical fiber; and (b) a second section of the optical waveguide located distal to the optical fiber for altering a vertical dimension of the optical mode of the light, with the second section further comprising the waveguide core sandwiched between the upper cladding layer and the mesa structure, and with the height of the waveguide core and the width of the mesa structure both increasing with distance away from the optical fiber.

21. The optical spot-size transformer of claim 20 wherein the optical fiber comprises a single-mode optical fiber.

22. The optical spot-size transformer of claim 20 wherein the waveguide core comprises a spin-coatable material selected from the group consisting of polymers, sol gels, and spin-on glasses.

23. The optical spot-size transformer of claim 22 wherein the upper and lower cladding layers comprise spin-coatable materials which have indices of refraction that are different from an index of refraction of the waveguide core.

24. The optical spot-size transformer of claim 20 wherein the upper cladding layer has a minimum width in the range of 0.5–2 microns at an end thereof facing the optical fiber.

25. The optical spot-size transformer of claim 20 wherein the width of the mesa structure in the second section of the optical waveguide increases nonlinearly with the distance away from the optical fiber.

26. The optical spot-size transformer of claim 20 further including a substrate for supporting the optical waveguide.

27. The optical spot-size transformer of claim 20 wherein the substrate comprises a material selected from the group consisting of semiconductors, glasses, fused silica, sapphire, metals, metal alloys, ceramics, polymers, resins, and printed wiring boards.

28. A method for forming a vertically-tapered optical waveguide on a substrate, comprising steps for:

(a) forming a lower cladding layer on the substrate, and patterning the lower cladding layer to form a mesa structure having a mesa width that varies with distance along at least a part of the length of the optical waveguide;

(b) forming a waveguide core on the mesa structure by depositing a spin-coatable material over the mesa structure with a thickness of the waveguide core at any point along the length of the optical waveguide being defined by the width of the mesa structure at that point; and (c) forming an upper cladding layer above the waveguide core.

29. The method of claim 28 wherein the step for depositing the spin-coatable material comprises rotating the substrate; spinning on the spin-coatable material over the substrate; and removing the spin-coatable material from the substrate at locations beyond the mesa structure.

30. The method of claim 29 further comprising a step for forming a first silicon oxynitride etch-stop layer over the mesa structure prior to the step for forming the waveguide core.

31. The method of claim 30 further comprising a step for forming a second silicon oxynitride etch-stop layer over the waveguide core prior to the step for forming the upper cladding layer.

* * * * *